US007085848B2

(12) United States Patent
Cabrera et al.

(10) Patent No.: US 7,085,848 B2
(45) Date of Patent: Aug. 1, 2006

(54) TIME-WINDOW-CONSTRAINED MULTICAST USING CONNECTION SCHEDULING

(75) Inventors: Luis Felipe Cabrera, Bellevue, WA (US); Venkata N. Padmanabhan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 845 days.

(21) Appl. No.: 10/099,251

(22) Filed: Mar. 15, 2002

(65) Prior Publication Data

US 2003/0177183 A1 Sep. 18, 2003

(51) Int. Cl.
G06F 15/16 (2006.01)
G06F 15/173 (2006.01)
(52) U.S. Cl. ............. 709/232; 709/203; 709/219; 709/239; 709/243
(58) Field of Classification Search ............ 709/203, 709/224, 232, 247; 713/178; 725/97, 101; 370/432
See application file for complete search history.

(56) References Cited

U.S. PATENT DOCUMENTS

| 5,920,701 | A | | 7/1999 | Miller et al. |
| 5,978,381 | A | * | 11/1999 | Perlman et al. ............. 370/432 |
| 5,991,306 | A | | 11/1999 | Burns et al. |
| 6,061,722 | A | * | 5/2000 | Lipa et al. .................. 709/224 |
| 6,223,286 | B1 | * | 4/2001 | Hashimoto .................. 713/178 |
| 6,275,496 | B1 | | 8/2001 | Burns et al. |
| 6,298,373 | B1 | | 10/2001 | Burns et al. |
| 6,324,182 | B1 | | 11/2001 | Burns et al. |
| 6,370,688 | B1 | * | 4/2002 | Hejna, Jr. .................. 725/101 |
| 6,842,768 | B1 | * | 1/2005 | Shaffer et al. ............. 709/203 |

| 2001/0014103 | A1 | | 8/2001 | Burns et al. |
| 2001/0018713 | A1 | | 8/2001 | Takeshi et al. |
| 2001/0056416 | A1 | | 12/2001 | Garcia et al. |
| 2002/0018484 | A1 | | 2/2002 | Kwang et al. |
| 2002/0056010 | A1 | * | 5/2002 | Lincoln et al. ............. 709/247 |
| 2003/0065810 | A1 | * | 4/2003 | Ims et al. ................... 709/232 |

(Continued)

FOREIGN PATENT DOCUMENTS

EP 1 035 703 A1 9/2000

(Continued)

OTHER PUBLICATIONS

Pulido et al., "SM: Real-time multicast protocols for simultaneous message delivery," in *Proceedings of the Fifth International Conference on Real-Time Computing Systems and Applications*, Hiroshima, Japan, Oct. 27-29, 1998, pp. 66-73 (IEEE Computing Society, 1998).

(Continued)

Primary Examiner—Rupal Dharia
Assistant Examiner—Quang N. Nguyen
(74) Attorney, Agent, or Firm—Wolf, Greenfield & Sacks, P.C.

(57) ABSTRACT

A method of reducing bandwidth limitations to send events to a set of interested clients within a pre-defined time period as quickly and fairly as possible. The clients can be re-distributed among the servers in a network such that the delay due to server overloading is minimized by moving clients from an overloaded server to a server with available bandwidth. In addition, the latency of client-server communications can be incorporated into an estimation of download times, and the servers can then initiate delivery to respective clients based on those download times. By staggering the send times to account for heterogeneous latencies, more clients can receive the event at the same time, and a fairness of distribution can be achieved.

48 Claims, 7 Drawing Sheets

U.S. PATENT DOCUMENTS

2003/0121050 A1* 6/2003 Kalva et al. .................. 725/97
2005/0021467 A1 1/2005 Franzdonk

FOREIGN PATENT DOCUMENTS

| WO | WO 98/57275 A2 | 12/1998 |
| WO | WO 01/46782 A2 | 6/2001 |
| WO | WO 01/69848 A2 | 9/2001 |
| WO | WO 01/97467 A | 12/2001 |
| WO | WO 02/17559 A | 2/2002 |

OTHER PUBLICATIONS

Tanaka et al., "A key distribution and rekeying framework with totally ordered multicast protocols," in *Proceedings of the 15th International Conference on Information Networking (ICOIN '01)*, Beppu City, Japan, Jan. 21-Feb. 2, 2001, pp. 831-838 (2001).

Akyildiz et al., "Multimedia Group Synchronization Protocols for Integrated Services Networks," *IEEE Journal*, (14), pp. 162-173, (1996).

Carter et al., "Server Selection Using Dynamic Path Characterization in Wide-Area Networks," *IEEE Journal*, pp. 1014-1021, (1997).

Xu et al., "Synchronized End-To-End Multicast In Real-Time Packet Cellular Networks," *IEEE Journal*, pp. 431-435, (1998).

* cited by examiner

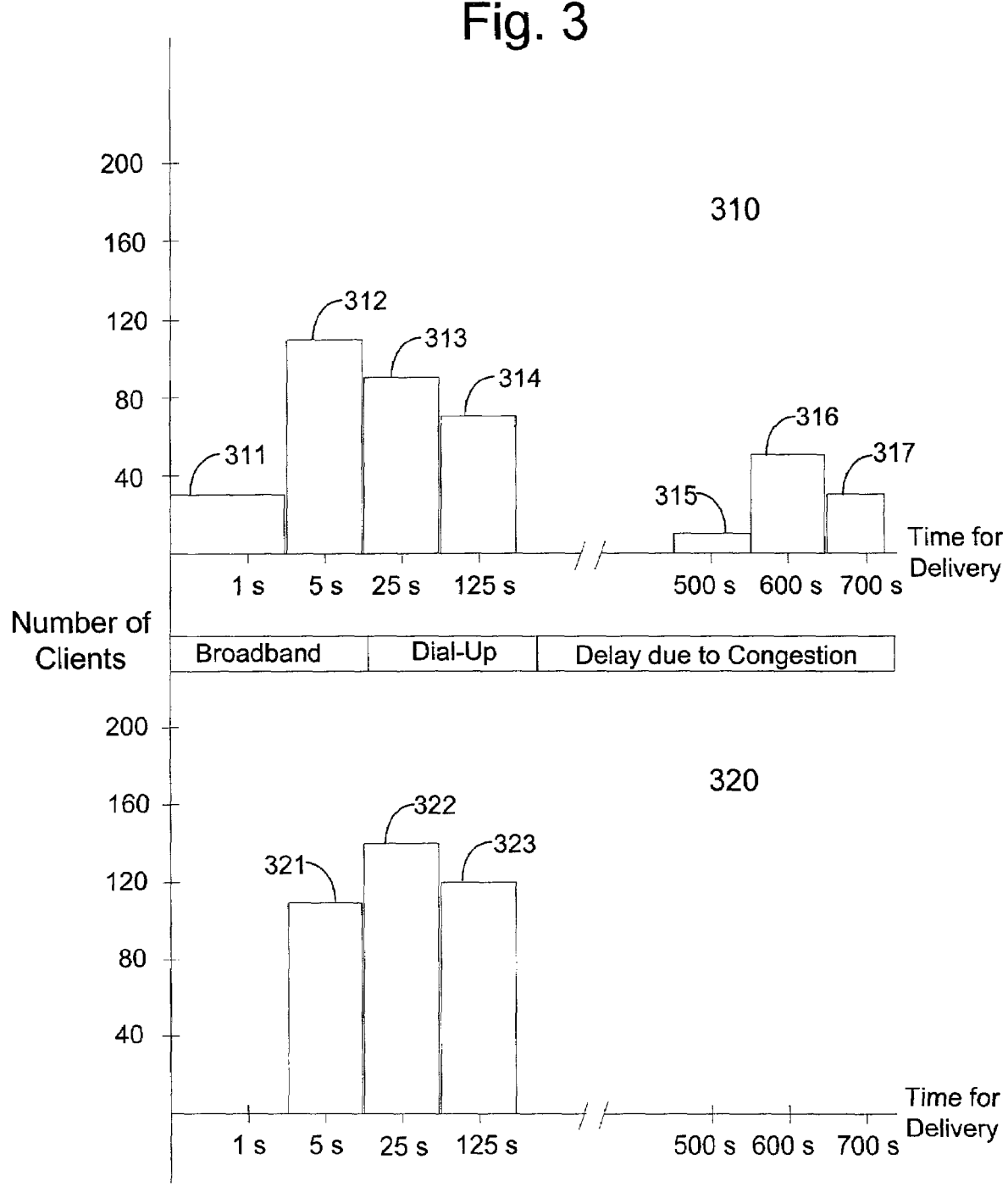

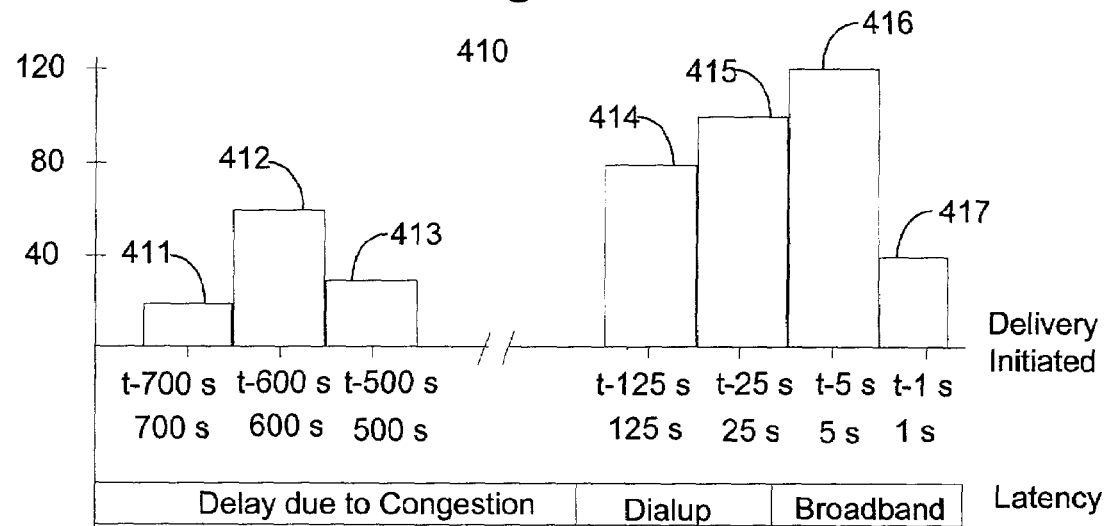
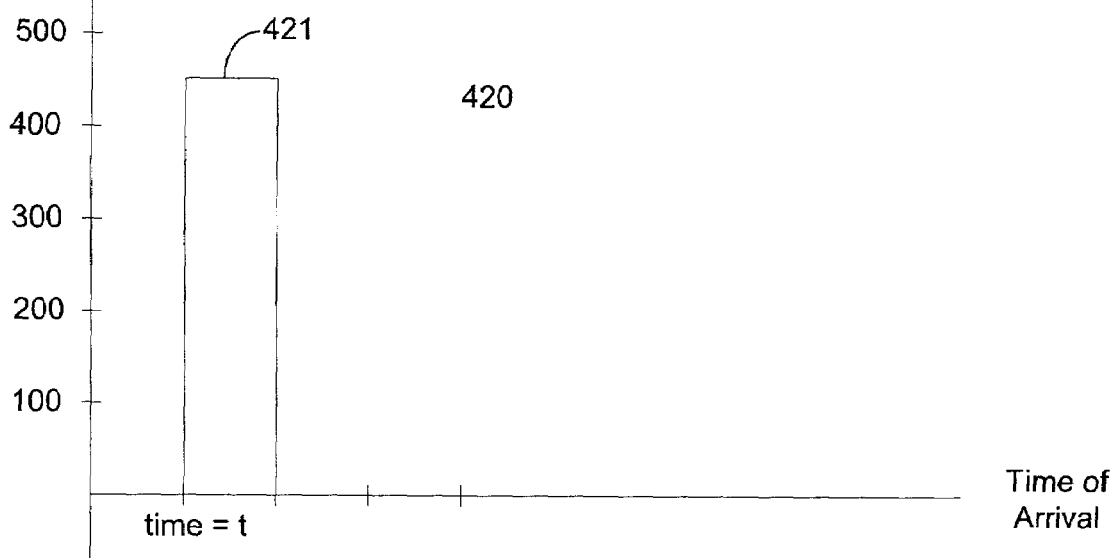
Fig. 4a

TIME-WINDOW-CONSTRAINED MULTICAST USING CONNECTION SCHEDULING

CROSS-REFERENCE TO RELATED APPLICATION

This application is related to U.S. application Ser. No. 10/999,242, entitled "Time-Window-Constrained Multicast for Future Delivery Multicast" filed concurrently with the present application, and which is incorporated herein by reference in its entirety.

TECHNICAL FIELD

This invention relates generally to content delivery across a network and, more particularly, relates to delivering content to multiple clients within a certain time frame.

BACKGROUND OF THE INVENTION

Over the last 30 years, the Internet has grown from a few servers controlled by the government and a few educational institutions into a vast, heterogeneous network of servers and clients. The servers on the Internet provide more functionality than ever before, ranging from the advertisement and sale of automobiles to tutorials on Ancient Greece. This range has been broadened due to at least three inter-related factors: increasing computing power, increasing bandwidth and increasing numbers of users. Unfortunately, while in most situations computing power has kept well ahead of the demands of its users, the slowly increasing bandwidth by which most communications is sent can be, and is at times, outstripped by the geometric growth of Internet users.

While this problem may be prevalent in smaller intranets and local-area networks, it is magnified on the Internet. For example, important news can result in more than 3 million hits per minute on popular news-related websites. Due to the necessarily finite bandwidth of service providers and web servers, such great demand can overwhelm a site, and a download that would ordinarily take seconds can take minutes. As users' connection speeds have improved, and users become accustomed to faster downloads, this delay in service has taken on increasing significance.

One of the solutions to this problem is multicasting. Multicasting is an Internet protocol that can allow for streaming content to be sent to many different users at the same time by a server sending only one stream of data. A specified port is used for multicasting.. The server sends its streaming data to this port, and clients who wish to receive the multicast "listen" on the specified port. Using this method, some of the bandwidth problems of normal "unicasting" can be overcome, and users can receive the data in a more timely and efficient fashion. Unfortunately, even this more robust method can be overwhelmed if sufficient numbers of users attempt to "listen" to the multicasting address simultaneously, and it is difficult for users of heterogeneous connection speeds to take advantage equally of the multicasting protocol.

Some information delivered by the Internet has a further complication in that it is not merely important that many users download content as quickly as possible; it is also important that they receive the content within a certain amount of time. Thus, the problem is how to deliver an event to all interested clients within a certain amount of time, such as within a given time window. One example of a situation in which the timing of the receipt of information can be important is the release of government data which can influence financial markets. In such a situation, those who receive the information first are in a position to profit from those who have not yet received the information. Furthermore, there is generally an initial time at which such information is released. Thus, the problem becomes how to send an event to a group of clients as close to the initial (or release) time as possible, but not after some later time beyond which the information becomes useless or stale. This problem is relevant from both an efficiency and fairness standpoint.

One difficulty in accomplishing this task is the problem of shifting network bandwidth discussed above. If many clients are logged on to a single server, the information flow from the server to each of the clients can be very slow. In a similar situation, the path between intermediate servers might be also be slowed so that everyone downstream from the congested server receives the information too late.

Another difficulty lies in the heterogeneity of client connectivity. While most corporate networks are now connected by high-speed backbones to the Internet, there are still many users who connect to the Internet using analog modems. If a user connected to the Internet through a broadband connection, such as a digital subscriber line connection, were able to begin accessing the information at the same time as a user connected via a 56 Kbps dialup connection, the user with the broadband connection would finish receiving the information long before the user on the slower connection. For example, if the event to be downloaded were 10 MB, it would take a 56 Kbps connection approximately 24 minutes to download the event, and a 1 Mbps digital subscriber line connection just 80 seconds.

Current methods of content distribution provide few tools to facilitate the sending of an event within a given time frame as fairly as possible to as many heterogeneous clients as necessary. Content and service providers generally pay no attention to fairness of distribution, or access at a particular time. Thus, only the fastest, most fortunate users will receive the content at an early time, often allowing them to unfairly profit from the other users who will receive the information at a later time proportional to network bandwidth and their own connection speed.

SUMMARY OF THE INVENTION

The present invention is directed to a method, computer-readable medium and system for distributing interested clients among servers in a network in order to facilitate delivering an event to those clients within a time window.

The present invention is further directed to a method, computer-readable medium and system for incorporating the latency of client-server communications into an estimation of download times in order to facilitate delivering an event to interested clients within a time window.

The present invention contemplates mechanisms that reduce bandwidth and heterogeneous client limitations on a network, and send events to a set of interested clients within a pre-defined time period as quickly and fairly as possible. One method contemplated by the present invention provides for the distribution of clients among servers such that the delay due to server overloading is minimized, and such that those clients with slower connection speeds can download an event relatively close to the theoretical minimum (given their connection speed and other relatively immutable connection characteristics.) In one embodiment, an originating server on which the event information is initially stored can be connected to a number of trusted edge servers delivering content to their connected clients. A trusted edge server is a server that can be trusted not to release information ahead of time, and maintains a connection, either directly or indirectly, to its clients. In other words, a trusted edge server is at the "edge" of a delivery network comprising trusted servers.

In this networked environment, the clients are distributed among the trusted edge servers based on empirical and theoretical estimates of the network bandwidth and latency. Then, at some time before the time at which the event is to be released to untrusted servers and clients, the event is distributed from the originating server to the trusted edge servers. Finally, upon receiving the event, the trusted edge servers deliver the event to their respective clients. As will be described below, the trusted edge servers may not deliver the event to their respective clients immediately. By sending the event to the trusted edge servers prior to the time at which the event is to be released, the event has a shorter network distance to travel from the trusted edge server to the clients and can, therefore, arrive more quickly. Network congestion between the originating server and the trusted edge servers need not affect the time after the release time at which the clients ultimately receive the event, because such network congestion is encountered and passed prior to the release time, when the event is transmitted from the originating server to the trusted edge servers. Additionally, the shorter network distance between the trusted edge server and the connected clients is likely to have more predicable performance. Such predictability can be especially useful when approximating how long the event will take to be transmitted from the trusted edge server to the client, as will be described in further detail below.

Another method contemplated by the present invention provides for the staggered delivery of an event to different servers and/or clients, such that the delivery is more fair, and the clients are more likely to receive the event at the same time. One embodiment of this method assumes the existence of an originating server attached to some number of trusted edge servers, which are logically connected to client machines. Based on empirical and theoretical estimates of network bandwidths and latencies, these trusted edge servers can compile a database of times for delivery for each client. Each trusted edge server can then determine the maximum of all of the delivery times between itself and its clients, and requests that the originating server transmit the event to the trusted edge server at least that maximum amount of time before the time at which the event is to be released. Upon receiving the event, each trusted edge server can initiate the transmission of the event to its interested clients at a time prior to the time at which the event is to be released. For example, a trusted edge server could initiate the transmission to all of its clients at a time calculated by subtracting the minimum transmission time of all of the clients from the time at which the event is to be released. Alternatively, the trusted edge server could initiate the transmission of the event to each client at a time calculated by subtracting the transmission time to that particular client from the time at which the event is to be released, thus taking the network bandwidth and latency of the individual connections into account. If the server performs the latter operation, the interested clients will each receive the event in its entirety approximately at the time at which the event is to be released, while the former operation may yield a more variable arrival time. To further improve the fairness and efficiency, the clients might first be redistributed among the servers to reduce the effects of some sources of latency, and, in some situations, to place clients with similar connection speeds on the same servers (thus making the staggered delivery more effective). This can enable near simultaneous acquisition of an event by a number of differently situated and connected clients according to an estimation of their particular client-server transmission times.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3 is a graphical representation of how the first method of this invention compares with network delivery in the prior art;

FIGS. 4a and 4b are a graphical representation of how the second method of this invention compares with network delivery in the prior art;

DETAILED DESCRIPTION OF THE INVENTION

Figure 1:
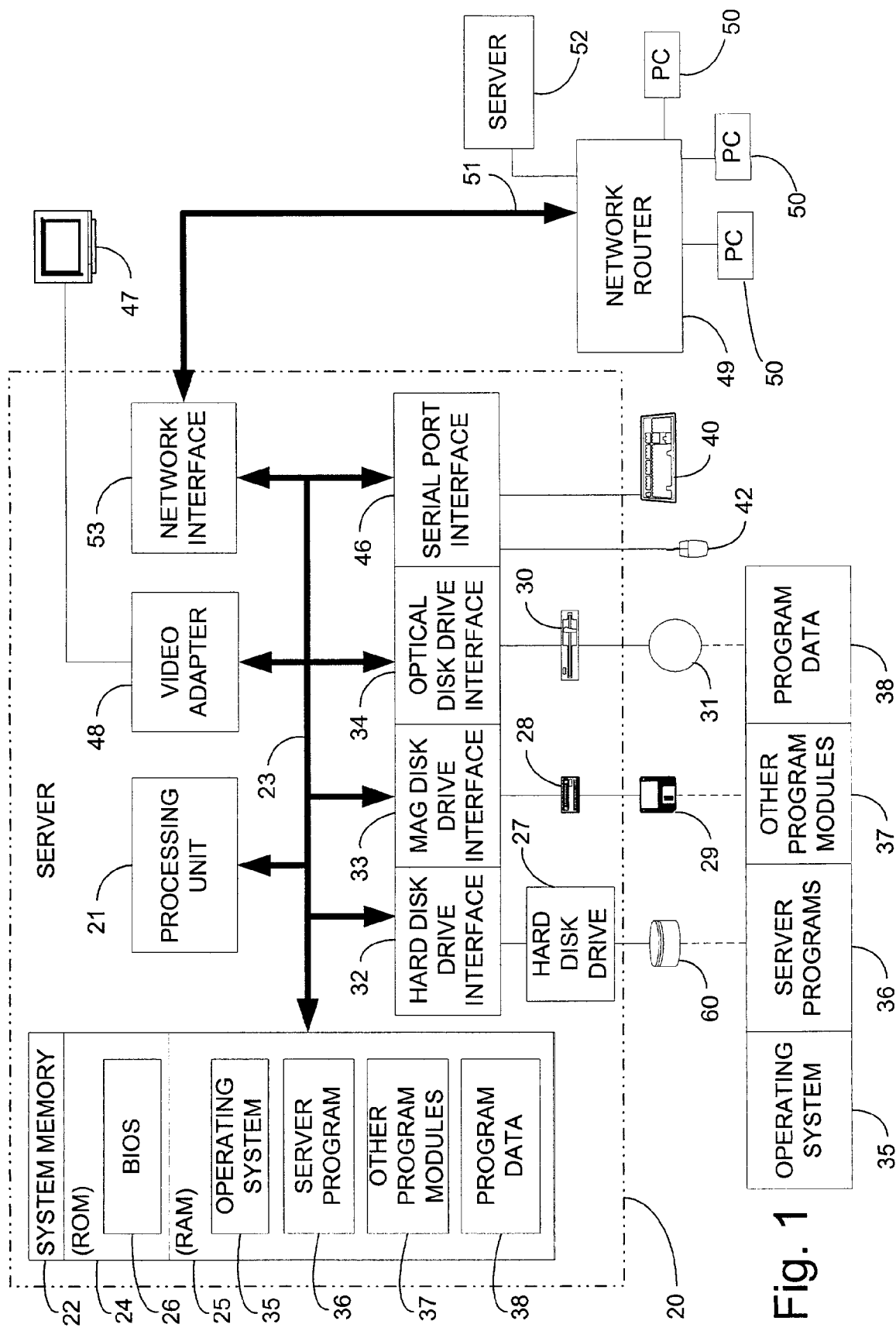
FIG. 1 is a block diagram generally illustrating an exemplary computer server on which the present invention resides.

The present invention is directed to a method, computer-readable medium and system for distributing interested clients among servers in a network in order to facilitate delivering an event to those clients within a time window. The present invention is further directed to a method, computer-readable medium and system for incorporating the network bandwidth and latency of client-server communications into an estimation of download times in order to facilitate delivering an event to interested clients within a time window. The present invention contemplates transferring clients between servers in order to minimize the time for delivery for each client-server connection and determining, either mathematically or empirically, an estimated transmission time to a client, or set of clients, and commencing the transmission of the event at a time earlier than the time at which the event is to be distributed to account for the estimated transmission time.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a server. Generally, program modules include routines, programs, objects, components, data structures and the like that perform particular tasks or implement particular abstract data types.

The invention may be implemented in computer system configurations other than a server. For example, the invention may be realized in routers, multi-processor systems, personal computers, consumer electronics, minicomputers, mainframe computers and the like. The invention may also be practiced in distributed computing environments, where tasks are performed by remote processing devices that are linked through a communications network. In a distributed computing environment, program modules may be located in both local and remote memory storage devices.

Although the invention may be incorporated into many types of computing environments as suggested above, the following detailed description of the invention is set forth in the context of an exemplary general-purpose computing device in the form of a conventional server 20.

Before describing the invention in detail, the computing environment in which the invention operates is described in connection with FIG. 1.

The server 20 includes a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the server 20, such as during start-up, is stored in ROM 24. The server 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the server 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more server programs 36, other program modules 37, and program data 38. A user may enter commands and information into the server 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device can also be connected to the system bus 23 via an interface, such as a video adapter 48.

The server 20 operates in a networked environment using logical connections to one or more remote clients 50 or remote servers 52 through network routers 49. The remote clients 50 may be a personal computer (PC), a network PC, a peer device or other common network node, and typically includes many of the elements described above relative to the server 20. The remote server 52 may be a mail server, a mirror server, a web server or other common network node, and typically includes many or all of the elements described above relative to the server 20. The network router 49 may be a one-armed router, an edge router, a multicast router, a software application or other common network node, and typically determines the next point in the network to which a packet should be forwarded. The logical connection 51 depicted in FIG. 1 might be a local area network (LAN) and/or a wide area network (WAN). Such networking environments are commonplace in offices, enterprise-wide computer networks, intranets and the Internet.

When used in a LAN or WAN networking environment, the server 20 is connected to the network 51 through a network interface or adapter 53. In a networked environment, program modules depicted relative to the server 20, or portions thereof, may be stored in a remote memory storage device, accessed through the network router 49. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

In accordance with one aspect of the invention, the clients in a set S that wish to receive an event E are distributed among trusted edge servers such that each client-server connection has approximately the same client connection-independent latency and thus has a time for delivery, $\beta$, close to a connection-dependent theoretical minimum. Furthermore, the event E is intended to be delivered not before an initial or release time, t, and not after some later time t+$\delta$ after which the event E becomes irrelevant, or the information contained in E becomes stale or no longer useful. If network congestion is introducing latency, this aspect of the invention can improve delivery times, enabling even clients with relatively slow connection speeds to receive the event, E, before t+$\delta$. As is known by those skilled in the art, latency is defined as the time it takes for a packet of data to get from one designated point to another. Latency, or delay, is dependent on a number of variables, including: propagation, transmission, routing and other computer and storage delays. Propagation reflects the speed with which optical or electrical signals can travel from the origin to the destination point; and routing reflects the delays introduced when gateway nodes take the time to examine the packet and header information. Both propagation and routing are normally small sources of latency, although in certain situations routing delays can become significant. More common sources of latency are those introduced by the medium itself, such as maximum theoretical transmission speed. The transmission speed can depend on the speed with which servers and clients can receive data. For example, dial-up modems can generally transfer at speeds up to 56 Kbps, while broadband connections can communicate at speeds exceeding 1 Mbps. The transmission speed can also depend on the extent to which a medium is "clogged" with many users consuming the available bandwidth. While the speed at which a client can receive data can be relatively immutable, because it is dependent on the network hardware of the client and the nature of the final connection between the client and its service provider, bandwidth problems, server-connection problems, as well as particular routing problems, can often be remedied by redistributing the clients among the available trusted edge servers.

Figure 2:
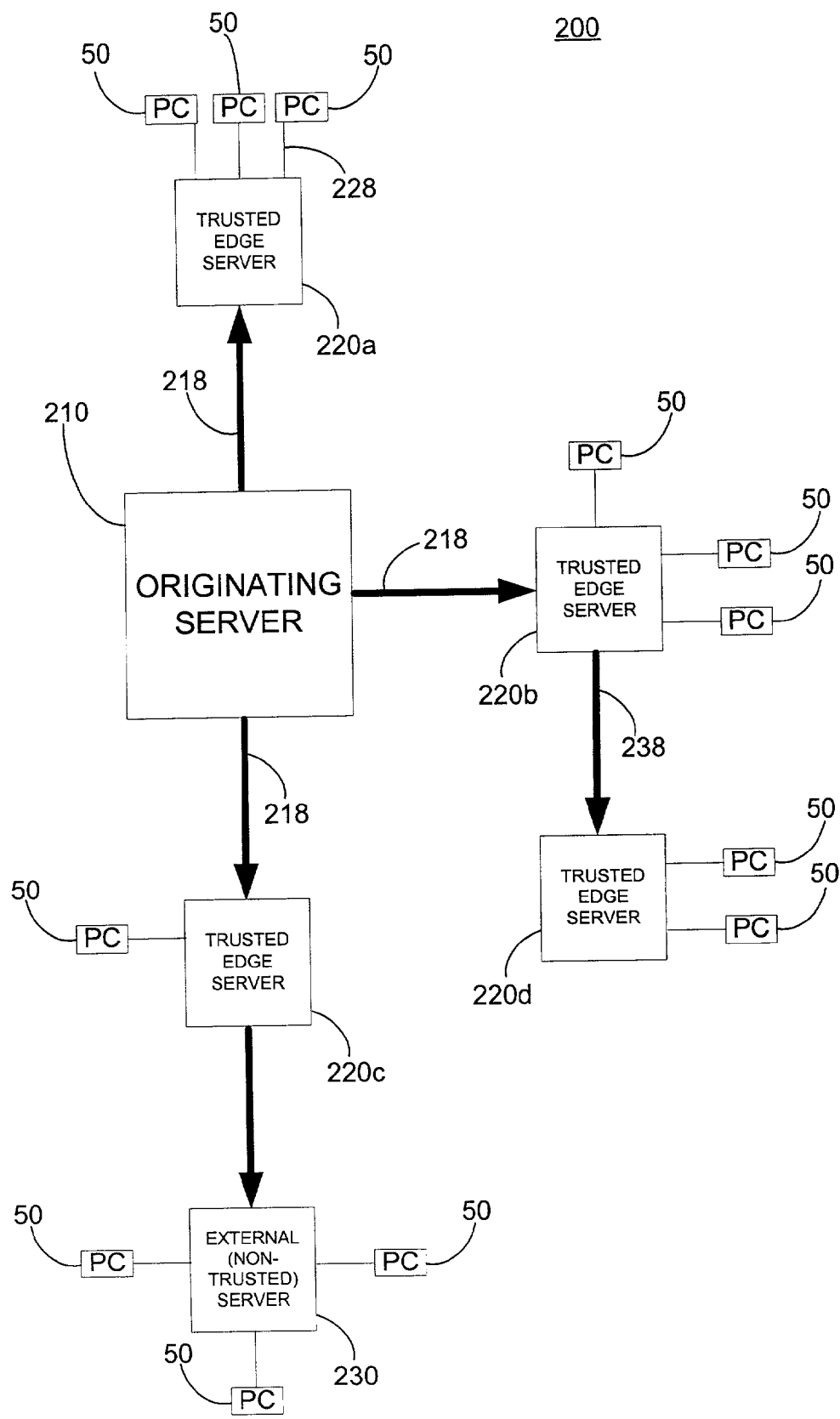
FIG. 2 is a block diagram generally illustrating an exemplary network across which the present invention might operate.

After distributing the clients such that each client's β is close to the theoretical minimum for that client-server connection, E is sent simultaneously to the clients at some time before, at, or even after time t, such that it arrives in its entirety before t+δ. FIG. 2 illustrates the environment for an exemplary embodiment of this invention. This embodiment contemplates a network 200 comprising an originating server 210 on which the event E is originally stored, and a number of trusted edge servers 220a, b, c and d delivering content to their logically connected clients 50. A trusted edge server 220 is a server that can be trusted not to release information ahead of time, and that is connected logically to clients 50. Thus, a trusted edge server 220 is the last step before leaving the set of servers that forms the trusted delivery network. The trusted delivery network is simply an overlay network that can exploit existing network connections and servers in distributing an event to clients. While these network connections and servers may be simultaneously providing disparate functionality, the trusted delivery network program enables communication between trusted edge servers, originating servers and clients. Therefore, the network of trusted edge servers 220 is not limited to any particular set of servers. Rather, trusted edge servers 220 can be enlisted from external servers 230 when necessary. When enlisting these servers, they can be authenticated to ensure that they can be trusted not to release the event E ahead of time, and their clocks can be synchronized with the rest of the network. This clock synchronization can be performed using techniques well-known in the art, such as Network Time Protocol (NTP) or other utilities now included with many operating systems. The trusted edge servers 220b may also connect to other trusted edge servers 220d through logical connections 238, thereby distributing to clients 50 and to other trusted edge servers 220d. As will be understood by those skilled in the art, the logical connections 218 between the originating server 210 and trusted edge servers 220, the logical connections 228 between the trusted edge servers 220 and clients 50, and the logical connections 238 between trusted edge servers can comprise many different connections through other servers and routers not shown in FIG. 2, including the particular client's 50 Internet Service Provider (ISP) or other network service provider.

Within this networked environment, the clients 50 are distributed among the trusted edge servers 220 based on empirical and theoretical estimates of the time for delivery, β. Then, at some time prior to time t, the event E is distributed from the originating server 210 to the trusted edge servers 220. In order to keep network traffic to a minimum, the originating server 210 may distribute E at different times to different trusted edge servers 220, or the originating server 210 may broadcast E to all trusted edge servers 220 at the same time. Finally, before, at, or even after time t, the trusted edge servers 220 can deliver the content, E, to their respective clients 50 such that it arrives in its entirety after t.

In accordance with another, complementary aspect of the present invention, the event E can be delivered to different clients and/or trusted edge servers at different times, such that more clients receive the event E within the time window [t, t+δ]. In those situations in which the time window is relatively small compared to the variation in times for delivery, staggering of delivery times can allow more clients to receive the transmission within the time window. This is especially true when the variation in times for delivery cannot be eliminated using the redistribution mechanism described generally above. Generally, an approximate time for delivery ξ can be estimated or derived for each client-server connection. Each trusted edge server can then determine the maximum time for delivery, $\xi_{Max}$, and the minimum time for delivery, $\xi_{Min}$, for its set of clients. Then, using that maximum time for delivery, the event E can be sent to each corresponding trusted edge server prior to $t-\xi_{Max}$. Depending upon the particular capabilities of the network, and the particular needs of the application, the trusted edge server can then initiate delivery of E to its clients at $t-\xi_{Min}$, or it can initiate delivery at different times $t-\xi$ for each client, adjusting the delivery time for each client-server connection. Thus, each client can receive E in its entirety at approximately time t, and prior to time t+δ. Alternatively, the trusted edge server can initiate delivery of E to its clients at some time after $t-\xi_{Min}$ but prior to $t+\delta-\xi_{Min}$. In such a situation each client can receive E in its entirety at approximately the same time within the time window [t, t+δ].

By transmitting the event to the edge of the trusted network, the trusted edge servers, the time required to transmit the event between the originating server and the trusted edge server is accounted for prior to the time at which the event is to be released to the clients. In such a manner the complexities and possibilities of network congestion in the connection between the originating server and the trusted edge servers are removed from the latency calculations, providing more simple, and more accurate, calculations involving only the last set of connections between the trusted edge servers and their clients. Furthermore, because the trusted edge servers are located physically closer to their clients, the possibility of physical network interruption, such as a damaged cable, or an electrical blackout, preventing the dissemination of the event to the clients is reduced.

Returning to FIG. 2, the trusted edge servers 220 can compile a database of estimated times for delivery, ξ, for each of their clients 50. Each trusted edge server 220 can determine the maximum ξ, $\xi_{Max}$, and minimum ξ, $\xi_{Min}$, of all of the ξ for its set of clients 50, and can then send a request to the originating server 210 that it transmit E to the trusted edge server 220 prior to $t-\xi_{Max}$. After receiving E, each trusted edge server 220 can either simultaneously initiate transmission of E at a time $t-\xi_{Min}$ or later to the clients 50, or initiate the transmission of E to each of its clients 50 at a time $t-\xi$ or later, thus taking the estimated time for delivery ξ into account. If the servers 220 perform this latter operation, each of the interested clients 50 can receive the event very close to t, while the former operation yields a more variable arrival time. This method can enable a number of differently situated and connected clients 50 to receive an event E in its entirety at approximately time t using an estimation of their respective times for delivery.

In keeping with the invention, the network environment of FIG. 2 illustrates an exemplary networked environment in which the present invention can be implemented. However, the present invention is not intended to be limited to any particular networking protocols or layouts. It can be implemented using TCP/IP protocols, AppleTalk protocols, Novell protocols, as well as on a Content Delivery Network, among others. These protocols will of course provide different levels of functionality. For example, in some networks, the server's software might perform a given function, while in other networks, the server's software might depend on the underlying protocol to provide this functionality. When describing the exemplary embodiments of the present invention, the particular information or functionality can be provided by the underlying protocols or might be provided by the software in a manner known to those skilled in the art. The underlying methods remain unchanged and can simply incorporate existing functions to complete the required tasks.

Turning to FIG. 3, a graphical representation of the effect of the distribution method of the present invention is shown. Bar graph 310 represents a particular trusted edge server's group of clients. So, for example, this might represent server 220a with hundreds of clients 50 logically connected to it. The time for delivery, β, for each client is estimated by methods discussed below. On this bar graph, the times for delivery (which would normally be a continuous function) have been approximated to fall into convenient logarithmic ranges below 200 seconds, and linear ranges above. So, the first group of clients 311 has times for delivery within the time range 0 s to 1.99 s, the second 312 times for delivery within the time range 2 s to 9.99 s, and so forth. As can be seen, this particular trusted edge server has a fairly large range of latencies.

Latency can be attributable to a number of different sources, as described in detail above. FIG. 3 illustrates a few sources of latency. Between 0 and 20 seconds, only broadband clients receive the event, assuming no other latencies. While some broadband clients might receive the event after 20 seconds due to network congestion and other network failures, only clients connected through a broadband connection can have a time for delivery less than 20 seconds. From 20 seconds to approximately 200 seconds might be the range of "normal" times for delivery to dial-up clients. The lower limit, 20 seconds, represents the theoretical minimum for the time for delivery. However, since it is practically difficult to achieve this standard, and since there are a variety of different dial-up connection speeds, a range of times is given, within which it is satisfactory for a dial-up user to receive the event. Of course, there may also be broadband users who receive the event between 20 and 200 seconds due to other latencies. Although two clients may fall within 313, one might be a high-connection-speed user connected through a moderately congested network that limits the bandwidth available for downloads, and the other might simply be connected to an Internet Service Provider through a 56 Kbps modem. For the clients in the 315–317 range, the longer delay is due mostly to network and server congestion, and can affect the times for delivery of both broadband and dial-up clients. The times of delivery for this group of delayed, heterogeneous clients might be reduced by redistributing them among the different trusted edge servers from which they can receive the event through a less congested path. Thus, for example, if there is a congested network, or a particularly slow network router between server 220a and one of its clients 50, there may be another trusted edge server 220b with a more efficient route to the client that can bypass this bottleneck. In this way, a long latency associated with one client-server connection might be remedied by changing servers. Thus, the range of delivery times can be made much narrower and more manageable by simply redistributing the clients among the available trusted edge servers, especially those clients with times for delivery much greater than 200 seconds as shown in FIG. 3.

By transferring clients between different servers on the trusted delivery network, the client-connection-independent latencies of each client-server connection can be reduced, such that the times for delivery, β, approach their theoretical minima. This is shown graphically in bar graph 320. The trusted edge server shown had approximately 450 clients before redistribution took place. These clients might have been assigned initially to this particular server for a number of different reasons (for example, the server may have been chosen by the client, with no knowledge of how congested the path is). However, once redistribution takes place, this particular server has only 370 clients, a net loss of 70 clients providing less congestion, and increasing the speed at which the remaining clients can receive the event.

Before distribution, other trusted edge servers would have different distributions of client times for delivery, some similar to and many different from that shown bar graph 310. After redistribution however, the trusted edge servers can have distributions of client times for delivery more similar to that shown in bar graph 320, differing only slightly according to the number and type of clients connected to the particular server. The originating server can then organize transmissions to different servers and different clients at different times according to the method graphically depicted in FIG. 4 and described below, or transmission can be made simultaneously. Depending upon the needs of the particular application, and using the above example, transmission can begin prior to time t, such as at t−200 s or t−2 s. Alternatively, the transmission could begin at time t, or even after t as well. In some situations it might be desirable to have the event arrive at all clients by t, without concern if some clients receive it beforehand. Using the example of FIG. 3, transmission might then be initiated at t−200 s, and many clients will receive the event before t. In those situations where it is undesirable that a client should receive the event in its entirety before t, transmission could be initiated at t−2 s, using the example shown in FIG. 3. The event could then arrive at clients between t and t+198 s. Finally, in those situations where it is crucial that a client not receive the event in its entirety before t, or where the more important constraint is that no clients receive the event in its entirety after t+δ, transmission may be initiated at any time after t up until t+δ−200 s (assuming that δ is greater than 200 seconds). The time for initiating the transfer can change according to the application, and will often use the methods described below with reference to FIGS. 4a and b to achieve more accurate results. Thus, the present invention can solve the initial problem of a client receiving an event E within a time window [t, t+δ]. In order to accommodate a smaller time window, the following method can also be used in concert with the redistribution of clients described above.

Figure 4B:
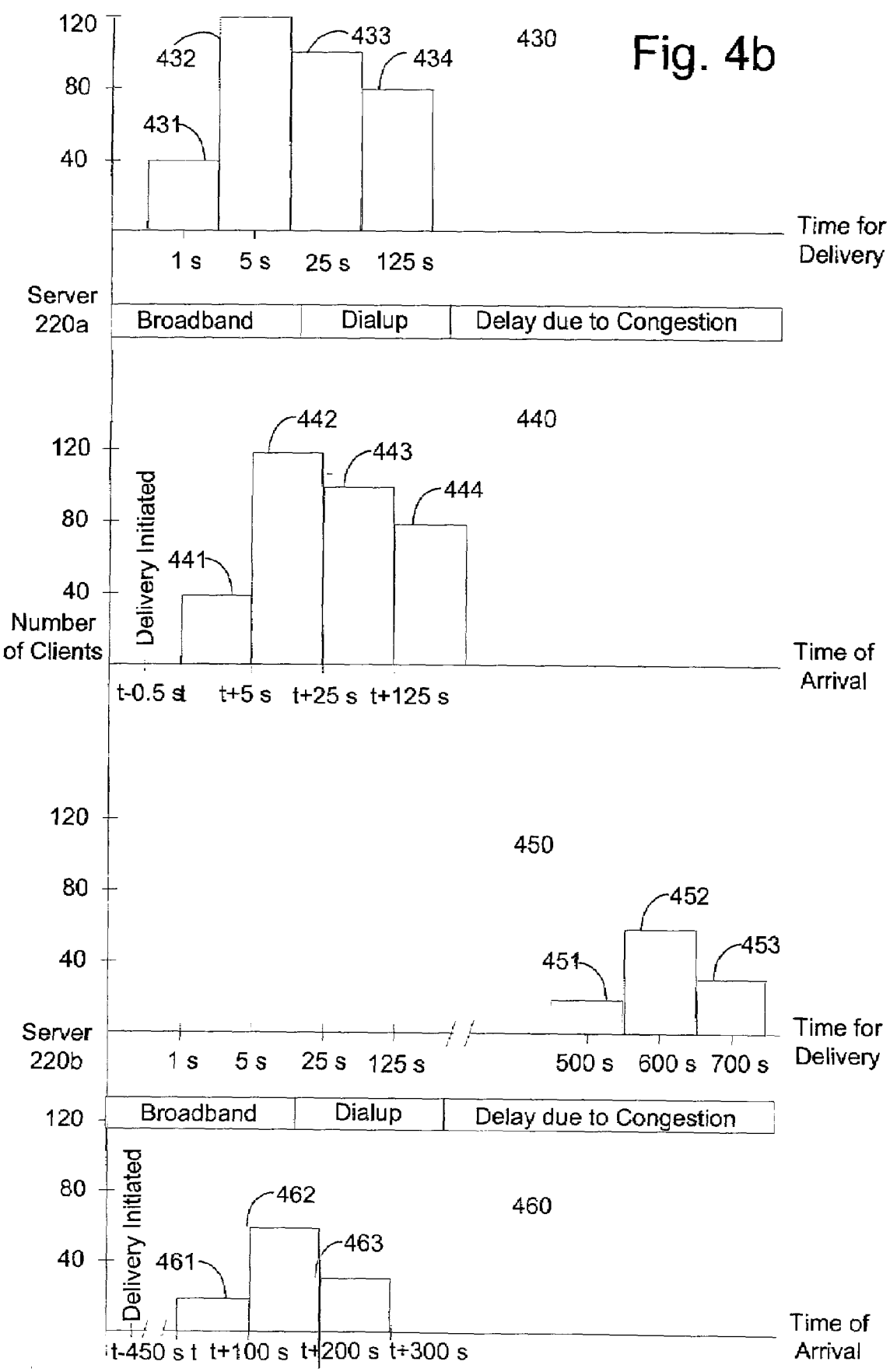

FIGS. 4a and 4b are graphical representations of the effect of the staggered delivery method of the present invention. The bar graph 410 in FIG. 4a might represent a particular trusted edge server's group of clients. In another implementation as shown in FIG. 4b, the bar graph 430 can represent one trusted edge server's clients, while bar graph 450 represents another trusted edge server's clients. Thus, for example, bar graphs 430 and 450 in FIG. 4b might represent servers 220a and 220b respectively, with server 220a's clients mostly having times for delivery below 200 seconds, and server 220b's clients mostly having times for delivery above 450 seconds. In both implementations, the time for delivery, β, for each client is estimated by methods discussed below. In FIGS. 4a and 4b, the times for delivery (which would normally be a continuous function) have been approximated to fall into convenient logarithmic ranges below 200 seconds, and linear ranges above. So, the first group of clients 431 and 417 has times for delivery within the time range 0 s to 1.99 s, the second 432 and 416 times for delivery within the time range 2 s to 9.99 s, and so forth.

After estimating the times for delivery, the trusted edge servers can stagger delivery to each client based on their individual times for delivery, or each trusted edge server can send the event simultaneously to its clients based on their times for delivery. The former method of delivery can ensure that each client receives the event in its entirety at a time very close to t, but at the expense of a more resource-intensive method. While the former method is obviously preferable in certain circumstances, it is not possible in certain protocols and application settings.

Returning to FIG. 4a, the delivery is staggered for each client based on its individual time for delivery. This can provide that each of the clients will receive the event at approximately time t. This is shown graphically at bar graph 410 in FIG. 4a. The trusted edge server has approximately 450 clients in the ranges 411–417 waiting to receive event E, with differing latencies and corresponding times for delivery. The trusted edge server estimates these times for delivery for each client, and initiates delivery to each client based on these estimated times for delivery. The bar graph 410 represents a time line of those times at which delivery is initiated, which is based in turn on the times for delivery for those respective clients. Thus, for those clients with longer times for delivery, such as clients in 411, delivery will be initiated earlier to account for the extra latency. If there are 20 clients in 411, which have a range of times for delivery from 650 to 749 seconds, the server will initiate delivery to these clients between t−749 and t−650 seconds, depending upon each client's time for delivery. Thus, the estimated times for delivery are incorporated into delivery timing decisions for each client.

Theoretically, each client should receive E in its entirety at exactly time t. The only practical errors will be introduced by estimation inaccuracies and variations in the latency introduced by unaccounted for factors. The sources of these inaccuracies will become clear when the process of estimation is more fully explored below.

Returning to FIG. 4b, each trusted edge server can transmit the event, E, to all of its clients simultaneously, although different trusted edge servers may or may not transmit the event at the same time. In this situation, a lone broadband client on a server with a number of dial-up clients can cause the dial-up clients to receive the event in its entirety long after t. Therefore, it can be beneficial to first organize the clients among the various trusted edge servers at least approximately according to times for delivery. This may be done according to the present invention, or by approximately separating the high and low connection speed clients onto different trusted edge servers. In FIG. 4b for example, the clients are separated between servers 220a and 220b, such that higher speed clients 431–434 are on server 220a, and lower speed clients 451–453 are on server 220b. According to the example shown in FIG. 4b, server 220a can therefore initiate transmission at time t, and server 220b can initiate transmission 450 seconds before that, at t−450 seconds (assuming that the shortest time for delivery for a client 50 on server 220b is greater than or equal to 450 seconds). Using these transmission times, server 220a's clients should receive the event in its entirety by time t+199 s, and server 220b's clients should receive the event in its entirety by time t+299 s. While this method is imperfect to the extent that there are anomalous clients on each server, it can yield a significant improvement over sending indiscriminately to all clients at time t.

Figure 5:
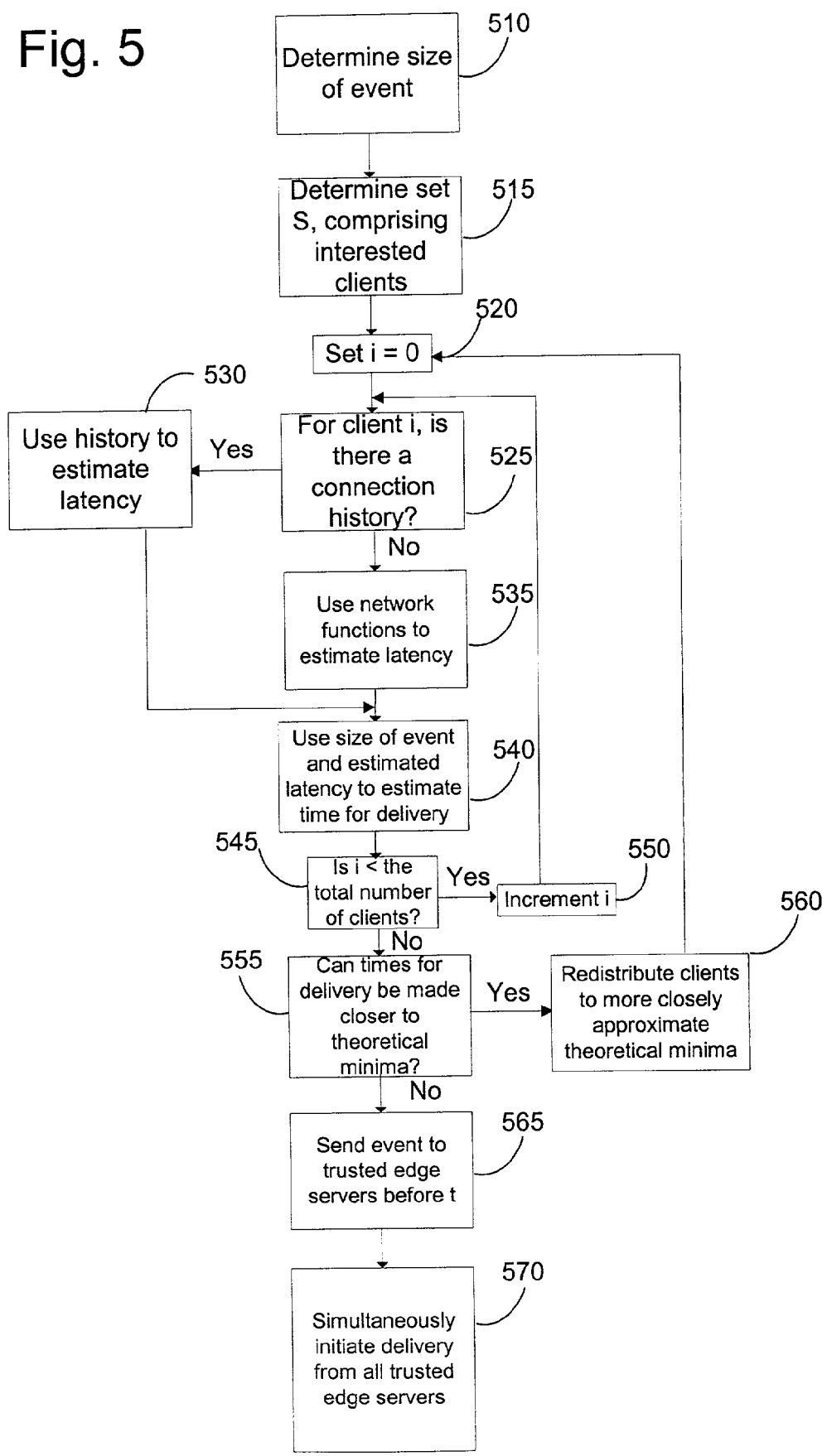
FIG. 5 is a flowchart generally illustrating the operation of the first method of this invention.
Figure 6:
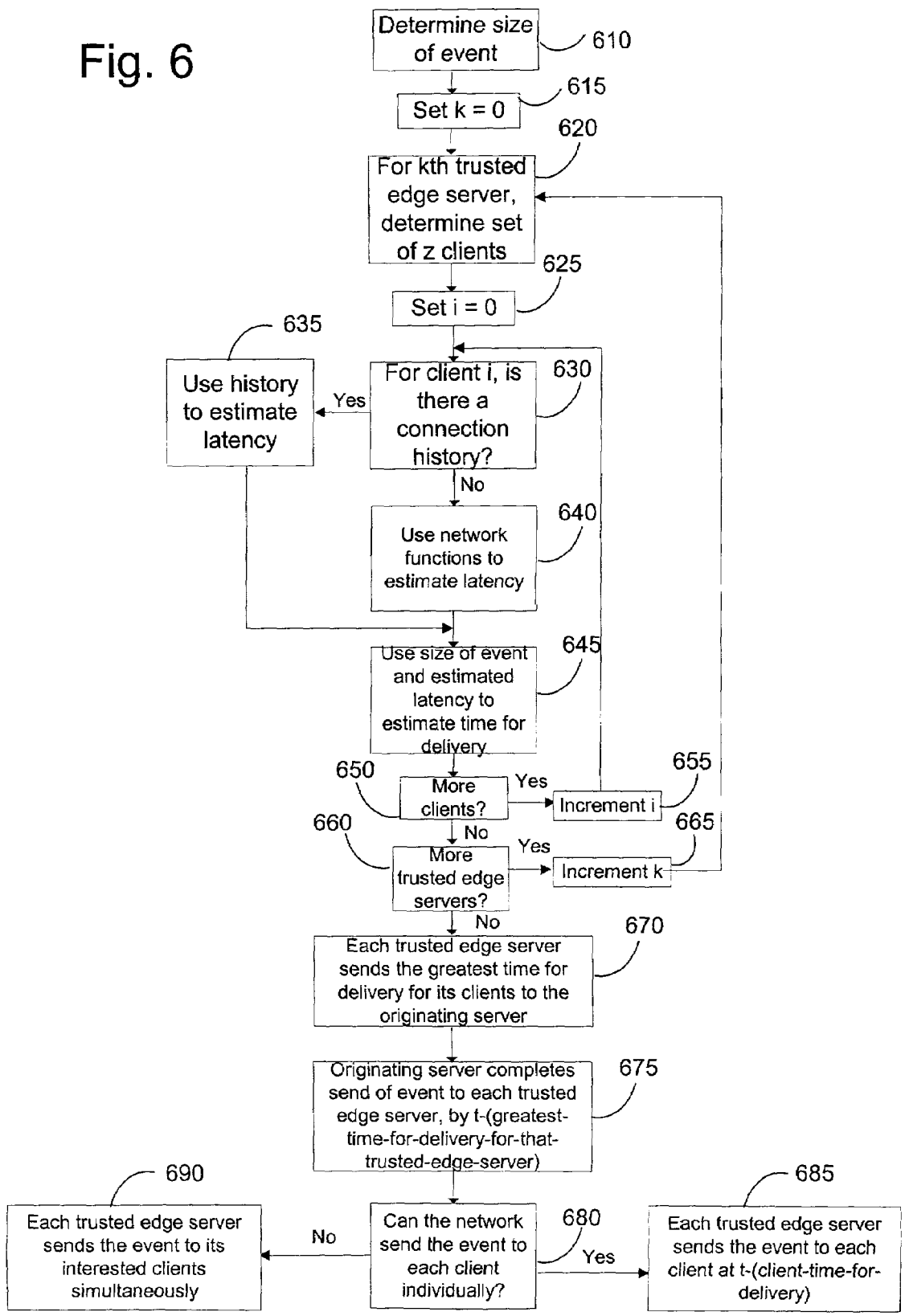
FIG. 6 is a flowchart generally illustrating the operation of the second method of this invention.

Turning to FIGS. 5 and 6, flow charts illustrating exemplary implementations of two claimed methods contemplated by the present invention are shown.

Not shown explicitly in FIG. 5 or 6, the event E contemplated by the present invention can be classified as any of a number of packets of data. For example, E may be a simple text file, a group of bits representing the key to a cryptographic code or even a large movie. The event, E, should arrive at interested clients no earlier than time t and no later than time t+δ. In some situations, t may be the more restrictive constraint (for example, when time t is relatively close to the present time), and in others, the size of the time window, δ, may be more restrictive (for example, when all clients should receive the event E at approximately the same time). There are numerous examples for when information sent out over the Internet might need to satisfy these requirements. One example is the Department of Commerce's economic reports. If a few clients were able to receive these economic reports and process them before other clients, they would be able to act on this information (by buying or selling stock for example) and would gain an unfair advantage. Another example may be weather information given on a weather site. All interested clients should receive this information in a timely manner, but, more importantly, if the weather information is updated every 5 minutes, clients should not receive the old information after t+5 minutes. In this example, it is important that all clients receive the weather information within the five-minute window.

Returning to FIG. 5, the size of the event can be determined at step 510. While step 510 is shown as the initial step, it can be inserted at any point before step 540, when the size is used to determine the time for delivery. Determining the size of an event is a task well understood by those skilled in the art and can be performed by the originating server. Most operating systems have integrated functionality that can determine the size of a particular file very rapidly, although this functionality can also be duplicated by application software. Once the event's size has been determined, it can be stored on the originating server for later use.

At step 515, the set S of interested clients can be determined. That is, the set S of clients that should receive the event E can be compiled. Depending on the particular event E, and the means employed, S may be compiled in a number of different ways. For example, a set of clients, S, that constantly needs events from a particular originating server can be managed centrally (perhaps with an administrator adding and subtracting clients manually) and would very rarely change. In an extension of the weather example described above, the originating server can send the event to any clients that request it. Those clients could send a properly formed request to receive the event E, and the server could indiscriminately add these clients to the set S. In yet another example, there might be an event E that should be accessible to some computers and not others. Those users that want to receive E could send a properly formed request to receive the event E as above, but the server could then add only those clients that are properly authenticated. Using these or other methods not described, a set S of allowed, interested clients can be formed at step 515. The information defining set S can be stored at the originating server 210, at the trusted edge servers 220a, b and c, or at separately situated servers (for example in the case of multicast events). As long as information about the clients in set S can be passed throughout the network, the present invention does not contemplate a particular storage area for information about set S.

As shown in FIG. 5, the method claimed by the present invention next queries each client-server connection to estimate its latency. As is broadly illustrated by the algorithm outlined on FIG. 5, there are two means of estimating latency: empirical and theoretical/mathematical. Most methods of estimating latency can fuse these two means to provide the most accurate estimation of latency. In one preferred embodiment, each client-server connection can first be checked for a connection history at step 525. If there has previously been an event transfer between these two computers, that history can be used in the latency estimation process. In another embodiment, the historical connection between the trusted edge server and a computer logically "close" to the client (i.e. connected to the same ISP) may also be used in the latency estimation process. In still another embodiment, a historical connection between a different trusted edge server and the particular client can be used in the latency estimation process. Yet another embodiment can use a historical connection between a different trusted edge server and a computer logically "close" to the client in the latency estimation process.

If there is a relevant connection history for the particular client-trusted edge server pairing, this history can then be used to estimate latency, step 530. In the implementation shown on FIG. 5, the connection history may yield a historical latency, which can be used as the estimate for the present latency. Data regarding the time, date, average traffic surrounding transmission, event-type, event-size, number of clients and other characteristics of the connection history may also be used to more accurately estimate the present latency. Depending on the network infrastructure, the information available, and the needs of the particular application, the estimation of the present latency using historical data can be more or less accurate.

If there is no connection history, network functions can be used to estimate the present latency, step 535. Using a relatively unsophisticated set of protocols like TCP/IP, much of the data supplied by the protocols' functions can be interpreted by an application in order to estimate the latency. On the other hand, when implemented within a sophisticated network, such as a Content Delivery Network, network functions for estimating latency may be predefined. In these networks, an application can simply use this underlying functionality to estimate latency. In one embodiment of the present invention, a relatively unsophisticated set of protocols, like TCP/IP, can be utilized. Using these protocols, the trusted edge server can perform many basic network functions such as: pinging the client to determine response time, measuring the proportion of dropped packets, measuring the queue length at the client machine, obtaining information from the routers on the network traffic between the client and itself, sending sample events to determine the round-trip time provoked, determining channels that are relatively poor between itself and the client over the long-term, and determining short term congestion based on traffic metrics. The data from this battery of tests can then be used to estimate the present latency. The particular methods of estimating latency will, of course, depend on the application's needs, and the particular means of implementation.

In the preferred embodiment of the present invention outlined in FIG. 5, the historical estimation technique 530 can be an alternative to the network estimation technique 535. However, in other implementations these techniques can be complementary. The present network data and long-term network statistics can be used to improve the historical analysis. Of course, with improved hardware and software algorithms, the accuracy of either technique can be improved.

Having estimated the latency, the size of the event and the estimated latency can be used to estimate the time for delivery for that client-server connection at step 540. This step can then be repeated for each client in the set S, step 550, until each client-server connection has an associated time for delivery, step 545.

Having estimated the time for delivery for each client-server connection, the originating or trusted edge servers can compare these times for delivery with theoretical minima, step 555. As described above, the theoretical minimum of a client-server connection depends primarily on the client's connection speed, and its connection to a service provider. If the times for delivery can be improved (i.e. approach the theoretical minima more closely) through redistribution, the originating server in conjunction with the trusted edge servers can redistribute the clients among the servers to equalize loads and delivery times, step 560. For example, if the number of clients at a particular trusted edge server is causing a bottleneck, some of those clients can be redistributed among other trusted edge servers. Similarly, if a few clients are geographically distant from a particular trusted server, they can be redistributed to find a closer, and therefore faster, trusted edge server connection. As in the estimation process, this process of redistribution can be accomplished by either a server application that redistributes clients among the servers, or through a sophisticated transmission layer, such as the content delivery network, which can be used to transfer clients among the trusted edge servers. In a typical redistribution process, a trusted edge server may find that its client-server times for delivery are much greater than their theoretical minima. It can then send requests to other trusted edge servers, asking if they have the bandwidth to accept additional clients. If another trusted edge server can take on these additional clients, it can respond to the first trusted edge server, the client data can be forwarded from the first trusted edge server, and the client can be transferred. There may be cases, of course, where a client has a particular long latency that cannot be remedied by any redistribution (for example, where a client's geographic location is very far from even the closest trusted edge server). However, in many cases, this method can yield times for delivery closely approaching their theoretical minima.

Once the clients have times for delivery approaching their theoretical minima, the process of transmission can begin. Using originating server to trusted edge server latencies, the event E can be distributed to the trusted edge servers at some point before time t, as indicated in step 565. Then, delivery can be initiated simultaneously at some time before or at time t from the trusted edge servers to the clients in set S, step 570. As described above, depending on the particular demands of the application, the delivery can be initiated at different times before time t. Alternatively, the transmission could begin at time t as well, or even after if the latency is not so great that the distribution will not be completed prior to t+δ. In some situations it might be desirable to have the event arrive at all clients by t, without concern if some clients receive it beforehand. Transmission can then be initiated at t minus (greatest-time-for-delivery), and many clients will receive the event in its entirety before t. In those situations where it is undesirable that a client should receive the event before t, transmission could be initiated at t minus (shortest-time-for-delivery). In those situations where it is crucial that a client not receive the event before time t, or where the originating server does not receive or create the event until after t minus (shortest-time-for-delivery), transmission can simply be initiated at time t. Finally, in those situations where the most important constraint is that the event not arrive in its entirety at the clients after time t+δ, transmission can sometimes be initiated after time t, at any time until t minus (greatest-time-for-delivery).

Turning to FIG. 6, once an event E is chosen to send, the size of the event can be determined, step 610. As above, while step 610 is shown as the initial step, it can be inserted at any point before step 645, when the size is used to determine the time for delivery. Once the event's size has been determined, it can be stored for later use.

For each trusted edge server, the set of interested clients S can be determined at step 620. Depending on the particular event E, and the means employed, S may be compiled in a number of different ways, as described above. Using these or other methods not described, a set S of allowed, interested clients for a particular trusted edge server can be determined at step 620. The information defining each set S can be stored on the originating server, at the corresponding trusted edge server, or at separately situated servers. As long as information about the clients in each set S can be passed rapidly throughout the network, the present invention does not contemplate a particular storage area for information about set S.

As shown in FIG. 6, each client-server connection can then be queried to estimate its latency. As is broadly illustrated by the algorithm outlined on FIG. 6, there can be two means of estimating latency: empirical and theoretical/mathematical. Most methods of estimating latency can fuse these two means to provide the most accurate estimation of latency. In the preferred embodiment, each client-server connection can first be checked for a connection history, step 630. If there has previously been an event transfer between these two computers, that history can be used in the latency estimation process. Other embodiments are also possible, as described in detail above.

If there is a relevant connection history for the particular client-trusted edge server pairing, this history can be used to estimate latency, step 635. In the implementation shown on FIG. 6, the connection history may yield a historical latency, which can be used as the estimate of the present latency. Data regarding the time, date, average traffic surrounding transmission, event-type, event-size, number of clients and other characteristics of the connection history may also be used to more accurately approximate the present latency. Depending on the network infrastructure, the information available, and the needs of the particular application, the estimation of the present latency using historical data can be more or less accurate.

If there is no connection history, network functions can be used to estimate the present latency at step 640, using the mechanisms described in detail above.

In a preferred embodiment of the present invention outlined in FIG. 6, the historical estimation technique 635 is shown as an alternative to the network estimation technique 640. However, in other implementations these techniques can be complementary. The present network data and long-term network statistics can be used to improve the historical analysis. Of course, with improved hardware and software algorithms, the accuracy of either technique can be improved.

Having estimated the latency, the size of the event and the estimated latency can be used to estimate the time for delivery, $\xi_i$, for a particular client-server connection, step 645. This step can then be repeated for each client in the each trusted edge server's set, step 655, until every client-server connection has an associated time for delivery, step 650.

Having estimated the time for delivery, $\xi_i$, for each client-server connection, each trusted edge server sends the maximum of all its times for delivery, $\xi_{max}$, to the originating server, step 670. The originating server stores these times for delivery for each corresponding server. The algorithms used to determine the maximum of all the times for delivery, $\xi_{max}$, are well understood by those skilled in the art. For example, one algorithm is to go through the list of times for delivery, and compare the $1^{st}$ to the $2^{nd}$ time. The computer then stores the larger of those two times, and compares that time to the $3^{rd}$ time, stores the largest of those two times, and compares that time to the $4^{th}$ time, and so on. This task may also be accomplished by implementing a similar algorithm as the times for delivery are estimated at step 645.

Once the originating server has received the $\xi_{max}$ from the trusted edge servers, the process of transmission can begin. Using information regarding the originating server to trusted edge server latencies, the event E can be distributed to each trusted edge server based on the $\xi_{max}$ for that server at some time prior to time t−$\xi_{max}$, step 675. Depending upon the particular capabilities of the network, and the particular needs of the application, each trusted edge server can then initiate delivery of E to its clients at t−$\xi_{min}$, or it can initiate delivery at different times t−$\xi_i$ for each client, adjusting the delivery time for each client-server connection, step 680. If the trusted edge servers send the event to each client at different times, the application will initiate delivery to each client at t−$\xi_i$, step 685. For example, if a trusted edge server has 4 clients, with the following times for delivery: client 1: 1 s, client 2: 2 s, client 3: 3 s, client 4: 4 s, then delivery could be initiated for client 1 at t−1 s, for client 2 at t−2 s, for client 3 at t−3 s and for client 4 at t−4 s. The trusted edge server can also receive the event E at some time before t−4 s, so that it could initiate delivery to the "farthest" client at that time. On the other hand, if each trusted edge server sends the event to its clients simultaneously, step 690, each trusted edge server may initiate delivery at time t−(minimum-time-for-delivery), or t−$\xi_{min}$. Using the above example, a trusted edge server with the same 4 clients would initiate delivery to all 4 clients at time t−1 s. In another implementation, the trusted edge servers may initiate delivery to clients at any time before or after t, as long as the event arrives in its entirety at the clients before t+δ. In other words, a trusted edge server may initiate delivery at any time before t+δ−$\xi_{max}$. This can provide flexibility of timing in those situations where it is more important to have the event arrive before t+δ or to have the event arrive in its entirety at all clients at approximately the same time, than to have the event arrive at a time close to time t.

In the present invention, the method of FIG. 5 described above for narrowing the range of times for delivery can be enhanced by also performing the method described above with reference to FIG. 6. By replacing steps 565 and 570 with steps 615 to 690, the present invention can often provide for more accurate times for delivery.

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of distributing a client among a first trusted edge server and a second trusted edge server, wherein a trusted edge server is a server, in a communications path between an originating server and a connected client, that can be trusted not to release information prior to an appropriate time, the method comprising: determining a first latency between the first trusted edge server and the client; determining a second latency between the second trusted edge server and the client; comparing the first latency to the second latency; and transferring the client to the second trusted edge server if the second latency is lower than the first latency, further comprising: obtaining a release time, wherein the release time is an earliest time at which an event is intended to be delivered to the client; obtaining a completion time, wherein the completion time is a latest time at which the event can arrive at the client; calculating a send time as a function of the first latency and the second latency; and sending the event to the client at the send time.

2. A method of distributing an event from a trusted edge server to a client, wherein the trusted edge server is a server, in a communications path between an originating server and a connected client, that can be trusted not to release information prior to an appropriate time, the method comprising: obtaining a release time, wherein the release time is an earliest time at which the event is intended to be delivered to the client; obtaining a completion time, wherein the completion time is a latest time at which the event can arrive at the client; determining a first latency between the trusted edge server and a first client; calculating a first send time as a function of the first latency; and sending the event from the trusted edge server to the client at the first send time, wherein the step of calculating the first send time further comprises: estimating a first delivery time using the first latency; and calculating the first send time to be prior to the completion time minus the first delivery time.

3. The method of claim 2, wherein the step of determining the first latency further comprises: estimating the first latency using a connection history between the trusted edge server and the first client.

4. The method of claim 2, wherein the step of determining the first latency further comprises: estimating the first latency using network functions to test a connection between the trusted edge server and the first client.

5. The method of claim 2, wherein the step of calculating the first send time further comprises: estimating a first delivery time using the first latency; and calculating the first send time as the release time minus the first delivery time.

6. The method of claim 2, wherein the event is distributed from the trusted edge server to a second client, the second client having a second latency, wherein calculating the first send time as a function of the first latency includes calculating the first send time as a function of the second latency, the method further comprising: sending the event from the trusted edge server to the second client at the first send time.

7. The method of claim 6, wherein the step of calculating the first send time further comprises: estimating a first delivery time as a function of the first latency; estimating a second delivery time as a function of the second latency; calculating the first send time to be equal to the release time minus the first delivery time if the second delivery time is greater than the first delivery time; and calculating the first send time to be equal to the release time minus the second delivery time if the first delivery time is greater than the second delivery time.

8. The method of claim 6, wherein the step of calculating the first send time further comprises: estimating a first delivery time as a function of the first latency; estimating a second delivery time as a function of the second latency; calculating the first send time to be prior to the completion time minus the first delivery time if the first delivery time is greater than the second delivery time; and calculating the first send time to be prior to the completion time minus the second delivery time if the second delivery time is greater than the first delivery time.

9. The method of claim 2 further comprising: determining a second latency between the trusted edge server and a second client; calculating a second send time as a function of the second latency; and sending the event from the trusted edge server to the second client at the second send time.

10. The method of claim 9, wherein the originating server distributes the event to the trusted edge server, the method further comprising: determining an originating latency between the originating server and the trusted edge server; calculating an originating send time as a function of the first send time, the second send time, and the originating latency; and sending the event from the originating server to the trusted edge server at the originating send time.

11. The method of claim 2, wherein the originating server distributes the event to the trusted edge server, the method further comprising: determining an originating latency between the originating server and the trusted edge server; calculating an originating send time as a function of the first send time and the originating latency; and sending the event from the originating server to the trusted edge server at the originating send time.

12. The method of claim 2, wherein: determining the first latency includes: determining a transfer latency; comparing the first latency to the transfer latency; and transferring the first client to a second trusted edge server if the transfer latency is lower than the first latency; calculating the first send time includes determining the first send time as a function of a second latency between the second trusted edge server and the first client; and sending the event includes sending the event from the second trusted edge server to the first client at the first send time if the transfer latency is lower than the first latency.

13. The method of claim 12, wherein the transfer latency is a latency between the second trusted edge server and the first client.

14. The method of claim 12, wherein the transfer latency is a minimum theoretical latency.

15. A method of distributing an event from a trusted edge server to a client, wherein the trusted edge server is a server, in a communications path between an originating server and a connected client, that can be trusted not to release information prior to an appropriate time, the method comprising: obtaining a release time, wherein the release time is an earliest time at which the event is intended to be delivered to the client; obtaining a completion time, wherein the completion time is a latest time at which the event can arrive at the client; determining a first latency between the trusted edge server and a first client communicating with the first trusted server; comparing the first latency to a first transfer latency; transferring the first client if the first transfer latency is lower than the first latency; calculating a first send time as a function of the first latency and the first transfer latency; and sending the event to the first client at the first send time, wherein the first transfer latency is a latency between a second trusted edger server and the first client and wherein transferring the first client if the first transfer latency is lower than the first latency includes transferring the first client to the second trusted edger server.

16. The method of claim 15, wherein the event is distributed from a second trusted edge server to a second client, and wherein calculating the first send time as a function of the first latency and the first transfer latency includes calculating the first send time as a function of a second latency and a second transfer latency, the method further comprising: determining the second latency between the second trusted edge server and the second client; comparing the second latency to the second transfer latency; transferring the second client if the second transfer latency is lower than the second latency; and sending the event to the second client at the first send time.

17. The method of claim 16, wherein the second trusted edge server is the first trusted edge server.

18. The method of claim 16, wherein the step of calculating the first send time further comprises: estimating a first delivery time as a function of the first latency and the first transfer latency; estimating a second delivery time as a function of the second latency and the second transfer latency; calculating the first send time to be prior to the completion time minus the first delivery time if the first delivery time is greater than the second delivery time; and calculating the first send time to be prior to the completion time minus the second delivery time if the second delivery time is greater than the first delivery time.

19. The method of claim 15, wherein the event is distributed from a second trusted edge server to a second client, the method further comprising: determining a second latency between the second trusted edge server and the second client; comparing the second latency to a second transfer latency; transferring the second client if the second transfer latency is lower than the second latency; calculating a second send time as a function of the second latency and the second transfer latency; and sending the event to the second client at the second send time.

20. A computer-readable medium, having computer-executable instructions for distributing an event from a trusted edge server to a client, wherein the trusted edge server is a server, in a communications path between an originating server and a connected client, that can be trusted not to release information prior to an appropriate time, the computer-executable instructions for performing steps comprising: obtaining a release time, wherein the release time is an earliest time at which the event is intended to be delivered to the client; obtaining a completion time, wherein the completion time is a latest time at which the event can arrive at the client; determining a first latency between the trusted edge server and a first client; calculating a first send time as a function of the first latency; and sending the event from the trusted edge server to the client at the first send time, wherein the step of calculating the first send time further comprises: estimating a first delivery time using the first latency; and calculating the first send time to be prior to the completion time minus the first delivery time.

21. The computer-readable medium of claim 20, wherein calculating the first send time as a function of the first latency includes calculating the first send time as a function of a second latency between the trusted edge server and a second client, the computer-readable medium having further computer-executable instructions for performing steps comprising: sending the event from the trusted edge server to the second client at the first send time.

22. The computer-readable medium of claim 21, wherein the step of calculating the first send time further comprises: estimating a first delivery time as a function of the first latency; estimating a second delivery time as a function of the second latency; calculating the first send time to be prior to the completion time minus the first delivery time if the first delivery time is greater than the second delivery time; and calculating the first send time to be prior to the completion time minus the second delivery time if the second delivery time is greater than the first delivery time.

23. The computer-readable medium of claim 20, having further computer-executable instructions for performing steps comprising: determining a second latency between the trusted edge server and a second client; calculating a second send time as a function of the second latency; and sending the event from the trusted edge server to the second client at the second send time.

24. A computer-readable medium, having computer-executable instructions for distributing an event from a trusted edge server to a client, wherein the trusted edge server is a server, in a communications path between an originating server and a connected client, that can be trusted not to release information prior to an appropriate time, the computer-executable instructions for performing steps comprising: obtaining a release time, wherein the release time is an earliest time at which the event is intended to be delivered to the client; obtaining a completion time, wherein the completion time is a latest time at which the event can arrive at the client; determining a first latency between the trusted edge server and a first client communicating with the first trusted server; comparing the first latency to a first transfer latency; transferring the first client if the first transfer latency is lower than the first latency; calculating a first send time as a function of the first latency and the first transfer latency; and sending the event to the first client at the first send time, wherein the first transfer latency is a latency between a second trusted edger server and the first client and wherein transferring the first client if the first transfer latency is lower than the first latency includes transferring the first client to the second trusted edger server.

25. The computer-readable medium of claim 24, having further computer-executable instructions for distributing the event from a second trusted edge server to a second client, wherein calculating the first send time as a function of the first latency and the first transfer latency includes calculating the first send time as a function of a second latency and a second transfer latency, the further computer-executable instructions performing steps comprising: determining the second latency between a second trusted edge server and a second client; comparing the second latency to a second transfer latency; transferring the second client if the second transfer latency is lower than the second latency; and sending the event to the second client at the first send time.

26. The computer-readable medium of claim 24, wherein the event is distributed from a second trusted edge server to a second client, the second client having a second latency, the computer-executable instructions performing steps further comprising: comparing the second latency to a second transfer latency; transferring the second client if the second transfer latency is lower than the second latency; calculating a second send time as a function of the second latency and the second transfer latency; and sending the event to the second client at the second send time.

27. A system for network distribution to minimize latencies, the system comprising: an originating server; a first trusted edge server having connected to it a client; a second trusted edge server, wherein a trusted edge server is a server, in a communications path between the originating server and a connected client, that can be trusted not to release information prior to an appropriate time; and computer-executable instructions for performing steps comprising: determining a first latency between the first trusted edge server and the client; determining a second latency between the second trusted edge server and the client; comparing the first latency to the second latency; and transferring the client to the second trusted edge server if the second latency is lower than the first latency, wherein the computer-executable instructions perform further steps comprising: obtaining a release time, wherein the release time is an earliest time at which an event is intended to be delivered to the client; obtaining a completion time, wherein the completion time is a latest time at which the event can arrive at the client; calculating a send time as a function of the first latency and the second latency; and sending the event to the client at the send time.

28. A system for efficient distribution, the system comprising: an originating server; a trusted edger server having connected to it a first client, wherein the trusted edge server is a server, in a communications path between the originating server and a connected client, that can be trusted not to release information prior to an appropriate time; and computer-executable instructions for performing steps comprising: obtaining a release time, wherein the release time is an earliest time at which the event is intended to be delivered to the first client; obtaining a completion time, wherein the completion time is a latest time at which the event can arrive at the first client; determining a first latency between the trusted edge server and the first client; calculating a first send time as a function of the first latency; and sending the event from the trusted edge server to the client at the first send time, wherein the step of calculating the first send time further comprises: estimating a first delivery time using the first latency; and calculating the first send time to be prior to the completion time minus the first delivery time.

29. The system of claim 28, wherein the step of calculating the first send time as a function of the first latency includes calculating the first send time as a function of a second latency, the system further comprising: computer-executable instructions for performing steps comprising: sending the event from the trusted edge server to a second client, the second client having a second latency, at the first send time.

30. The system of claim 29 wherein the step of calculating the first send time further comprises: estimating a first delivery time as a function of the first latency; estimating a second delivery time as a function of the second latency; calculating the first send time to be prior to the completion time minus the first delivery time if the first delivery time is greater than the second delivery time; and calculating the first send time to be prior to the completion time minus the second delivery time if the second delivery time is greater than the first delivery time.

31. The system of claim 28, further comprising: computer-executable instructions for performing steps comprising: determining a second latency between the trusted edge server and a second client; calculating a second send time as a function of the second latency; and sending the event from the trusted edge server to the second client at the second send time.

32. The system of claim 31, further comprising: computer-executable instructions for performing steps comprising: determining an originating latency between the originating server and the trusted edge server; calculating an originating send time as a function of the first send time, the second send time, and the originating latency; and sending the event from the originating server to the trusted edge server at the originating send time.

33. The system of claim 28, further comprising: computer-executable instructions for performing steps comprising: determining an originating latency between the originating server and the trusted edge server; calculating an originating send time as a function of the first send time and the originating latency; and sending the event from the originating server to the trusted edge server at the originating send time.

34. The system of claim 28, wherein: the computer-executable instructions for determining the first latency include computer-executable instructions for performing steps comprising: determining a transfer latency; comparing the first latency to a transfer latency; and transferring the first client to a second trusted edge server if the transfer latency is lower than the first latency; the computer-executable instructions for calculating the first send time include computer-executable instructions for determining the first send time as a function of a second latency between the second trusted edge server and the first client; and the computer-executable instructions for sending the event include computer-executable instructions for sending the event from the second trusted edge server to the first client at the first send time if the transfer latency is lower than the first latency.

35. The system of claim 34, wherein the transfer latency is a latency between the second trusted edge server and the first client.

36. The system of claim 34, wherein the transfer latency is a minimum theoretical latency.

37. A system for efficient event distribution, the system comprising: a first trusted edge server having connected to it a first client; a second trusted edger server, wherein a trusted edge server is a server, in a communications path between an originating server and a connected client, that can be trusted not to release information prior to an appropriate time; and computer-executable instructions for performing steps comprising: obtaining a release time, wherein the release time is an earliest time at which the event is intended to be delivered to the first client; obtaining a completion time, wherein the completion time is a latest time at which the event can arrive at the first client; determining a first latency between the trusted edge server and the first client; comparing the first latency to a first transfer latency; transferring the first client if the first transfer latency is lower than the first latency; calculating a first send time as a function of the first latency and the first transfer latency; and sending the event to the first client at the first send time, wherein the first transfer latency is a latency between the second trusted edger server and the first client and wherein the computer-executable instructions for transferring the first client if the first transfer latency is lower than the first latency include computer-executable instructions for transferring the first client to the second trusted edger server.

38. The system of claim 37, wherein the computer-executable instructions for calculating the first send time as a function of the first latency and the first transfer latency include computer-executable instructions for calculating the first send time as a function of a second latency and a second transfer latency, the system further comprising: computer-executable instructions for performing steps comprising: determining the second latency between the second trusted edge server and a second client; comparing the second latency to the second transfer latency; transferring the second client if the second transfer latency is lower than the second latency; and sending the event to the second client at the first send time.

39. The system of claim 38, wherein the second trusted edge server is the first trusted edge server.

40. The system of claim 38, wherein the computer-executable instructions for calculating the first send time further comprise computer-executable instructions for performing steps comprising: estimating a first delivery time as a function of the first latency and the first transfer latency; estimating a second delivery time as a function of the second latency and the second transfer latency; calculating the first send time to be prior to the completion time minus the first delivery time if the first delivery time is greater than the second delivery time; and calculating the second send time to be prior to the completion time minus the second delivery time if the second delivery time is greater than the first delivery time.

41. The system of claim 37, further comprising: computer-executable instructions for performing steps comprising: determining a second latency between the second trusted edge server and a second client; comparing the second latency to a second transfer latency; transferring the second client if the second transfer latency is lower than the second latency; calculating a second send time as a function of the second latency and the second transfer latency; and sending the event to the second client at the second send time.

42. A method of distributing an event from a trusted edge server to a client, wherein the trusted edge server is a server, in a communications path between an originating server and a connected client, that can be trusted not to release information prior to an appropriate time, the method comprising: a step for obtaining a release time, wherein the release time is an earliest time at which the event is intended to be delivered to the client; a step for obtaining a completion time, wherein the completion time is a latest time at which the event can arrive at the client; a step for determining a first latency between the trusted edge server and a first client; a step for calculating a first send time as a function of the first latency; and a step for sending the event from the trusted edge server to the client at the first send time, wherein the step for calculating the first send time further comprises: a step for estimating a first delivery time using the first latency; and a step for calculating the first send time to be prior to the completion time minus the first delivery time.

43. The method of claim 42 further comprising: a step for determining a second latency between the trusted edge server and a second client; a step for calculating a second send time as a function of the second latency; and a step for sending the event from the trusted edge server to the second client at the second send time.

44. The method of claim 42, wherein: the step for determining the first latency includes: a step for determining a transfer latency; a step for comparing the first latency to the transfer latency; and a step for transferring the first client to a second trusted edge server if the transfer latency is lower than the first latency; the step for calculating the first send time includes a step for determining the first send time as a function of a second latency between the second trusted edge server and the first client; and the step for sending the event includes a step for sending the event from the second trusted edge server to the first client at the first send time if the transfer latency is lower than the first latency.

45. A trusted edge server for distributing an event to a client, wherein the trusted edge server is a server, in a communications path between an originating server and a connected client, that can be trusted not to release information prior to an appropriate time, comprising: means for obtaining a release time and a completion time, wherein the release time is an earliest time at which the event is intended to be delivered to the client, and the completion time is a latest time at which the event can arrive at the client; means for determining a first latency between the trusted edge server and a first client; means for calculating a first send time as a function of the first latency; and means for sending the event from the trusted edge server to the client at the first send time, wherein means for calculating the first send time further comprises: means for estimating a first delivery time using the first latency; and means for calculating the first send time to be prior to the completion time minus the first delivery time.

46. The trusted edge server of claim 45, wherein the means for calculating the first send time as a function of the first latency include means for calculating the first send time as a function of a second latency between the trusted edge server and a second client, and wherein the means for sending the event from the trusted edge server to the first client at the first send time include means for sending the event from the trusted edge server to the second client at the first send time.

47. The trusted edge server of claim 46, wherein the means for calculating the first send time further comprise: means for estimating a first delivery time as a function of the first latency, and a second delivery time as a function of the second latency; means for calculating the first send time to be prior to the completion time minus the first delivery time if the first delivery time is greater than the second delivery time; and means for calculating the first send time to be prior to the completion time minus the second delivery time if the second delivery time is greater than the first delivery time.

48. A trusted edge server for distributing an event to a client, wherein the trusted edge server is a server, in a communications path between an originating server and a connected client, that can be trusted not to release information prior to an appropriate time, comprising: means for obtaining a release time and a completion time, wherein the release time is an earliest time at which the event is intended to be delivered to the client, and the completion time is a latest time at which the event can arrive at the client; means for determining a first latency between the trusted edge server and a first client communicating with the first trusted server; means for comparing the first latency to a first transfer latency; means for transferring the first client if the first transfer latency is lower than the first latency; means for calculating a first send time as a function of the first latency and the first transfer latency; and means for sending the event to the first client at the first send time, wherein the first transfer latency is a latency between a second trusted edger server and the first client and wherein means for transferring the first client if the first transfer latency is lower than the first latency includes means for transferring the first client to the second trusted edger server.

* * * * *

UNITED STATES PATENT AND TRADEMARK OFFICE
CERTIFICATE OF CORRECTION

PATENT NO. : 7,085,848 B2
APPLICATION NO. : 10/099251
DATED : August 1, 2006
INVENTOR(S) : Cabrera et al.

It is certified that error appears in the above-identified patent and that said Letters Patent is hereby corrected as shown below:

In column 1, line 9, delete "10/999,242," and insert -- 10/099,242, --, therefor.

In column 1, line 49, delete "multicasting.." and insert -- multicasting. --, therefor.

Signed and Sealed this

Twentieth Day of April, 2010

David J. Kappos
*Director of the United States Patent and Trademark Office*